(12) United States Patent
Kandekar et al.

(10) Patent No.: US 9,131,343 B2
(45) Date of Patent: Sep. 8, 2015

(54) SYSTEM AND METHOD FOR AUTOMATED PROXIMITY-BASED SOCIAL CHECK-INS

(75) Inventors: Kunal Kandekar Kandekar, Jersey City, NJ (US); Hugh Svendsen, Chapel Hill, NC (US); Eugene Matthew Farrelly, Cary, NC (US)

(73) Assignee: Teaneck Enterprises, LLC, Wilmington, DE (US)

( * ) Notice: Subject to any disclaimer, the term of this patent is extended or adjusted under 35 U.S.C. 154(b) by 356 days.

(21) Appl. No.: 13/303,189

(22) Filed: Nov. 23, 2011

(65) Prior Publication Data

US 2012/0252418 A1   Oct. 4, 2012

Related U.S. Application Data

(60) Provisional application No. 61/470,031, filed on Mar. 31, 2011.

(51) Int. Cl.
*H04W 4/00* (2009.01)
*H04W 4/02* (2009.01)
*H04W 4/20* (2009.01)

(52) U.S. Cl.
CPC .............. *H04W 4/021* (2013.01); *H04W 4/028* (2013.01); *H04W 4/206* (2013.01)

(58) Field of Classification Search
USPC ............. 455/41.2, 412.1, 412.2, 414.1, 414.2
See application file for complete search history.

(56) References Cited

U.S. PATENT DOCUMENTS

| | | |
|---|---|---|
| 5,493,692 A | 2/1996 | Theimer et al. |
| 5,713,073 A | 1/1998 | Warsta |
| 5,754,939 A | 5/1998 | Herz et al. |
| 6,014,090 A | 1/2000 | Rosen et al. |
| 6,049,711 A | 4/2000 | Ben-Yehezkel et al. |
| 6,349,203 B1 | 2/2002 | Asaoka et al. |
| 6,446,004 B1 | 9/2002 | Cao et al. |
| 6,456,852 B2 | 9/2002 | Bar et al. |
| 6,542,749 B2 | 4/2003 | Tanaka et al. |
| 6,549,768 B1 | 4/2003 | Fraccaroli |

(Continued)

FOREIGN PATENT DOCUMENTS

| | | |
|---|---|---|
| EP | 2051480 A1 | 4/2009 |
| EP | 2151797 A1 | 2/2010 |

(Continued)

OTHER PUBLICATIONS

Choney, Suzanne, "Mobile services mushroom for locating friends," Aug. 14, 2008, copyright 2008, MSNBC.com, 1 page.

(Continued)

*Primary Examiner* — Sam Bhattacharya

(57) ABSTRACT

Systems and methods for performing automatic social check-ins are disclosed. In one embodiment, in response to physical proximity between a user device and a venue-operated device located at a venue, an automatic check-in process is performed on behalf of a user of the user device. In one embodiment, the automatic check-in process is performed by first determining whether to perform an automatic check-in for the user of the user device at the venue based on one or more predefined automatic check-in rules and a user context and/or venue data that describes the venue. Upon determining that an automatic check-in is to be performed, a check-in for the user of the user device is performed to check the user into the venue via one or more check-in services.

23 Claims, 9 Drawing Sheets

(56) References Cited

U.S. PATENT DOCUMENTS

| | | |
|---|---|---|
| 6,618,593 B1 | 9/2003 | Drutman et al. |
| 6,658,095 B1 | 12/2003 | Yoakum et al. |
| 6,668,173 B2 | 12/2003 | Greene |
| 6,700,506 B1 | 3/2004 | Winkler et al. |
| 6,970,088 B2 | 11/2005 | Kovach |
| 7,085,571 B2 | 8/2006 | Kalhan et al. |
| 7,110,744 B2 | 9/2006 | Freeny, Jr. |
| 7,206,568 B2 | 4/2007 | Sudit |
| 7,227,937 B1 | 6/2007 | Yoakum et al. |
| 7,269,426 B2 | 9/2007 | Kokkonen et al. |
| 7,315,823 B2 | 1/2008 | Brondrup |
| 7,394,345 B1 | 7/2008 | Ehlinger et al. |
| 7,423,580 B2 | 9/2008 | Markhovsky et al. |
| 7,512,649 B2 | 3/2009 | Faybishenko et al. |
| 7,607,096 B2 | 10/2009 | Oreizy et al. |
| 7,668,537 B2 | 2/2010 | De Vries |
| 7,770,137 B2 | 8/2010 | Forbes et al. |
| 7,787,886 B2 | 8/2010 | Markhovsky et al. |
| 7,796,946 B2 | 9/2010 | Eisenbach |
| 7,801,954 B2 | 9/2010 | Cadiz et al. |
| 8,208,943 B2 | 6/2012 | Petersen et al. |
| 2004/0158739 A1 | 8/2004 | Wakai et al. |
| 2004/0189465 A1 | 9/2004 | Capobianco et al. |
| 2005/0105734 A1 | 5/2005 | Buer et al. |
| 2006/0119882 A1 | 6/2006 | Harris et al. |
| 2006/0242239 A1 | 10/2006 | Morishima et al. |
| 2007/0004426 A1 | 1/2007 | Pfleging et al. |
| 2007/0075898 A1 | 4/2007 | Markhovsky et al. |
| 2007/0136228 A1 | 6/2007 | Petersen |
| 2007/0210936 A1 | 9/2007 | Nicholson |
| 2007/0214180 A1 | 9/2007 | Crawford |
| 2007/0233859 A1 | 10/2007 | Zhao et al. |
| 2008/0032703 A1 | 2/2008 | Krumm et al. |
| 2008/0043041 A2 | 2/2008 | Hedenstroem et al. |
| 2008/0076505 A1 | 3/2008 | Nguyen et al. |
| 2008/0092233 A1 | 4/2008 | Tian et al. |
| 2008/0120409 A1 | 5/2008 | Sun et al. |
| 2008/0140650 A1 | 6/2008 | Stackpole |
| 2008/0158230 A1 | 7/2008 | Sharma et al. |
| 2008/0168489 A1 | 7/2008 | Schraga |
| 2008/0288338 A1 | 11/2008 | Wiseman et al. |
| 2008/0306826 A1 | 12/2008 | Kramer et al. |
| 2008/0313329 A1 | 12/2008 | Wang et al. |
| 2009/0030999 A1 | 1/2009 | Gatzke et al. |
| 2009/0093261 A1 | 4/2009 | Ziskind et al. |
| 2009/0199242 A1 | 8/2009 | Johnson et al. |
| 2009/0215469 A1 | 8/2009 | Fisher et al. |
| 2009/0254975 A1 | 10/2009 | Turnbull et al. |
| 2009/0291672 A1 | 11/2009 | Treves et al. |
| 2009/0319607 A1 | 12/2009 | Belz et al. |
| 2009/0327073 A1 | 12/2009 | Li et al. |
| 2010/0062794 A1 | 3/2010 | Han |
| 2010/0082427 A1 | 4/2010 | Burgener et al. |
| 2010/0113065 A1 | 5/2010 | Narayan et al. |
| 2010/0130233 A1 | 5/2010 | Parker |
| 2010/0153144 A1 | 6/2010 | Miller et al. |
| 2010/0162149 A1 | 6/2010 | Sheleheda et al. |
| 2010/0185552 A1 | 7/2010 | DeLuca et al. |
| 2010/0197318 A1 | 8/2010 | Petersen et al. |
| 2010/0197319 A1 | 8/2010 | Petersen et al. |
| 2010/0198683 A1 | 8/2010 | Aarabi |
| 2010/0198826 A1 | 8/2010 | Petersen et al. |
| 2010/0198828 A1 | 8/2010 | Petersen et al. |
| 2010/0198862 A1 | 8/2010 | Jennings et al. |
| 2010/0198870 A1 | 8/2010 | Petersen et al. |
| 2010/0198917 A1 | 8/2010 | Petersen et al. |
| 2010/0201482 A1 | 8/2010 | Robertson et al. |
| 2010/0201536 A1 | 8/2010 | Robertson et al. |
| 2010/0259386 A1 | 10/2010 | Holley et al. |
| 2010/0273509 A1 | 10/2010 | Sweeney et al. |
| 2010/0299615 A1* | 11/2010 | Miluzzo et al. ............ 715/752 |
| 2010/0317323 A1 | 12/2010 | Facemire et al. |
| 2012/0123830 A1 | 5/2012 | Svendsen et al. |
| 2012/0123871 A1 | 5/2012 | Svendsen et al. |
| 2012/0123875 A1 | 5/2012 | Svendsen et al. |
| 2012/0124176 A1 | 5/2012 | Curtis et al. |
| 2013/0060635 A1* | 3/2013 | Walker et al. ............ 705/14.58 |

FOREIGN PATENT DOCUMENTS

| | | |
|---|---|---|
| GB | 2399928 A | 9/2004 |
| WO | 2006/118755 A2 | 11/2006 |
| WO | 2007/092668 A2 | 8/2007 |
| WO | 2009/043020 A2 | 4/2009 |

OTHER PUBLICATIONS

Cox, L.P. et al., "Presence-Exchanges: Toward Sustainable Presence-Sharing," In Proc. of 7th IEEE Workshop on Mobile Computing Systems and Applications, Apr. 6-7, 2006, Semiahmoo Resort, Washington, pp. 55-60, 6 pages.

"dodgeball.com :: mobile social software," at <http://www.dodgeball.com/>, copyright 2008, Google Inc., printed Jan. 16, 2008, 1 page.

"Face in Hole", at <http://www.mahalo.com/face-in-hole>, states that the website debuted in Mar. 2008, copyright 2007-2010, Mahalo.com Incorporated, printed Oct. 26, 2010, 4 pages.

"Fire Eagle : What is Fire Eagle?", found at <http://fireeagle.yahoo.net/help> on the Internet Archive, dated Jul. 9, 2011, copyright 2007-2011, Yahoo! Inc., printed Nov. 10, 2011, 4 pages.

Ha, Anthony, "Shopkick's mobile shopping app tracks you in stores, delivers real-time deals," Aug. 3, 2010, found at <http://venturebeat.com/2010/08103/shopkick-best-buy/>, printed Nov. 10, 2011, 6 pages.

"Late problem solved: first GPS based notification for Mobile phones goes online," Jul. 3, 2007, copyright 2006-2007, Office Assitance LLC, at <http://www.offce-outlook.com/outlook-news/late-problem-solved-fir . . . >, originally published Jul. 2, 2007, PR Newsire Association LLC, at <http://www.prnewswire.com/news-releases/late-problem-solved-first-gps-based-notification-for-mobile-phones-goes-online-52696107.html>, 1 page.

Li, N. et al., "Analysis of a Location-based Social Network," IEEE International Conference on Computa-tional Science and Engineering, Symposium on Social Intelligence and Networking, Aug. 29-31, 2009, vol. 4, IEEE Computer Society, Los Alamitos, California, pp. 263-270, article found at <http://www.cs.uml.edu/~glchen/papers/brightkite-sin09.pdf>, 8 pages.

Murph, D., "GPS notification software informs managers of your tardiness," posted Jul. 2, 2007, copyright 2003-2007, Weblogs, Inc., found at <http://www.engadgetcom/2007/07/02/gps-notification-service-infor . . . >, printed Sep. 24, 2007, 5 pages.

Perez, Sarah, "How to Hack Nike+ for Automatic Foursquare Check-ins," Sep. 3, 2010, found at <http://www.readwriteweb.com/archives/how_to_hack_nike_for_automatic_foursquare_check-ins.php>, printed Mar. 10, 2011, 4 pages.

Perkins, S., "Foursquare Testing NFC, Adds Merchant Rewards," Mar. 10, 2011, found at <http://www.slashgear.com/foursquare-testing-nfc-adds-merchant-rewards-10139249/#, copyright 2006-2011, SlashGear, printed Mar. 11, 2011, 8 pages.

Siegler, MG, "Check-In on Foursquare Without Taking Your Phone Out of Your Pocket," Aug. 2, 2010, found at <http://techcrunch.com/2010/08/02/future-checkin/#>, copyright 2011, TechCrunch, printed Mar. 10, 2011, 10 pages.

stumble!to, "About stumble!to," found at <http://stumble.to/about> on the Internet Archive, dated Sep. 21, 2010, printed Nov. 10, 2011, 1 page.

\* cited by examiner

SYSTEM AND METHOD FOR AUTOMATED PROXIMITY-BASED SOCIAL CHECK-INS

RELATED APPLICATIONS

This application claims the benefit of provisional patent application Ser. No. 61/470,031, filed Mar. 31, 2011, the disclosure of which is hereby incorporated herein by reference in its entirety.

FIELD OF THE DISCLOSURE

The present disclosure relates to social check-ins and more specifically relates to automated proximity-based social check-ins.

BACKGROUND

Social check-ins, which are referred to herein simply as check-ins, are a popular way for users to announce their presence at venues or their attendance of events at venues via web-based check-in services. Some exemplary web-based check-in services are FourSquare®, Facebook® Places, and Gowalla®. Check-in services provide venue operators an easy way to publicize and offer coupons. However, with the proliferation of such check-in services, users often experience "check-in fatigue" from having to bring out their mobile devices to manually perform check-ins. As such, there is a need for systems and methods that enable automated, or automatic, check-ins.

SUMMARY

Systems and methods are disclosed for performing automatic social check-ins, which are simply referred to herein as check-ins. In one embodiment, in response to physical proximity between a user device and a venue-operated device located at a venue, an automatic check-in process is performed on behalf of a user of the user device. As used herein, a venue is a locale or physical place to which people come for a specific purpose (e.g., a restaurant, a night club, a sports arena, a store, or the like). A venue may also be referred to as a Point of Interest (POI). In one embodiment, the automatic check-in process is performed by first determining whether to perform an automatic check-in for the user of the user device at the venue based on one or more predefined automatic check-in rules and a user context and/or venue data that describes the venue. Upon determining that an automatic check-in is to be performed, a check-in for the user of the user device is performed to check the user into the venue via one or more check-in services.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1:
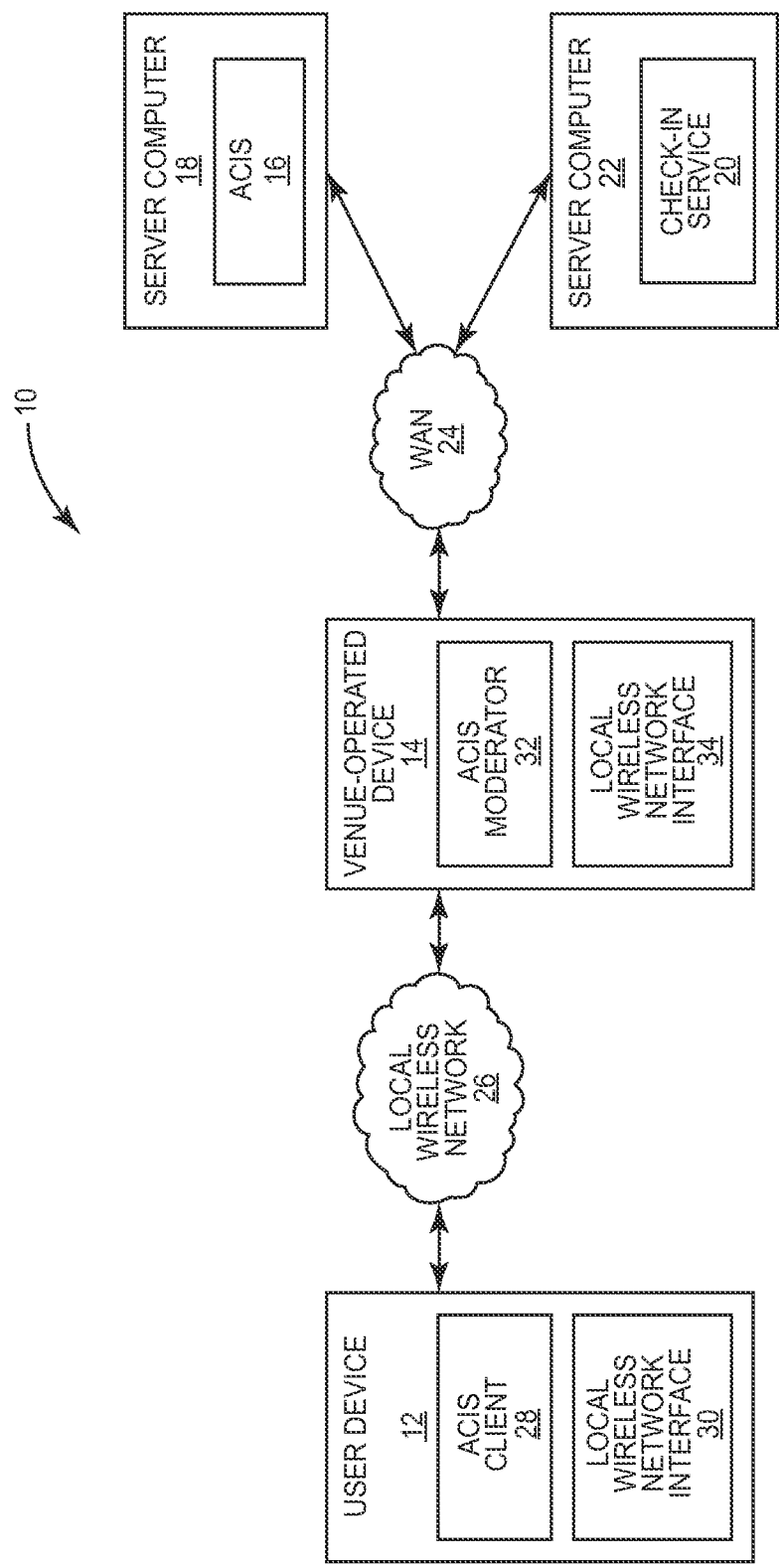
FIG. 1 illustrates a system for providing automatic check-ins according to one embodiment of the present disclosure.

FIG. 1 illustrates a system 10 for providing automatic check-ins according to one embodiment of the present disclosure. As used herein, a "check-in" is an announcement made via a web-based check-in service that a user, or person, is present at a venue or an event occurring at a venue. As discussed below, a web-based check-in service is either: (1) a web-based service whose primary function is to enable users to check-in to venues and, in some implementations, events held at venues (e.g., the FourSquare® service) or (2) a web-based service whose primary function is something other than enabling check-ins but that also enables users to check-in to venues and, in some implementations, events held at venues (e.g., the Facebook® social networking service which allows check-ins via Facebook® Places). As used herein, in its most general sense, a venue is a locale or physical place (e.g., a person's home, a restaurant, a night club, a sports arena, a store, an outdoor amusement park, or the like). However, in one specific embodiment, a venue is limited to a locale or physical place to which people come for a specific purpose (e.g., a restaurant, a night club, a sports arena, a store, an outdoor amusement park, or the like). A venue may also be referred to as a Point of Interest (POI).

As illustrated in FIG. 1, the system 10 includes a user device 12, a venue-operated device 14, an Automatic Check-In Service (ACIS) 16 hosted by a server computer 18, and a check-in service 20 hosted by a server computer 22. The venue-operated device 14 and the server computers 18 and 22 are communicatively coupled by a Wide Area Network (WAN) 24. The WAN 24 may be any type of wired or wireless WAN or any combination of WANs. For example, the WAN 24 may be a distributed public network such as the Internet, where the venue-operated device 14 and the server computers 18 and 22 are connected to the WAN 24 via wired or wireless connections. When in physical proximity to one another, the user device 12 and the venue-operated device 14 are communicatively coupled, or connected, via a local wireless network 26. In this embodiment, the local wireless network 26 is a Local Area Network (LAN) or a Personal Area Network (PAN) that enables a direct point-to-point wireless connection between the user device 12 and the venue-operated device 14. For example, the local wireless network 26 may be a Bluetooth® network, an IEEE 802.11x network, or a similar local wireless network.

In general, the venue-operated device 14 is located at a venue. When the user device 12 is in proximity to the venue-operated device 14, the venue-operated device 14 sends a request to the ACIS 16 to perform an automatic check-in process on behalf of a user of the user device 12 for the venue of the venue-operated device 14. As used herein, the user device 12 is in "proximity" to the venue-operated device 14 when the user device 12 is detected within a local wireless coverage area of the venue-operated device 14, or vice versa. In some embodiments, "proximity" may be determined using additional requirements such as, for example, a Received Signal Strength Indicator (RSSI) value that is less than a predefined threshold for "proximity", a duration of a connection between the user device 12 and the venue-operated device 14 that is greater than a predefined threshold for "proximity," an amount of time during which signals from the user device 12 are detected by the venue-operated device 14 or vice versa is greater than a predefined threshold for "proximity," or any combination thereof.

The user device 12 is a mobile user device such as, for example, a smartphone, cellular telephone, portable gaming device, portable media player, or similar portable user device. The user device 12 includes an ACIS client 28 and a local wireless network interface 30. While not shown, one of ordinary skill in the art will readily appreciate that the user device 12 includes additional components to enable its operation. The ACIS client 28 is preferably implemented in software and executed by a controller of the user device 12, but is not limited thereto. The ACIS client 28 may alternatively be implemented in a combination of hardware and software. The ACIS client 28 may also be implemented as a web interface running in a browser on the user device 12, where a web application is provided by the ACIS 16 hosted on the server computer 18. As discussed below, the ACIS client 28 performs functions such as, for example, enabling the user of the user device 12 to define automatic check-in rules that are used to determine when to perform automatic check-ins on behalf of the user of the user device 12. The local wireless network interface 30 is implemented in hardware or a combination of hardware and software and provides an interface between the user device 12 and the venue-operated device 14 via the local wireless network 26 when the user device 12 is in proximity to the venue-operated device 14.

The venue-operated device 14 is generally a physical device located at a particular venue. More specifically, the venue-operated device 14 may be a wireless network access point or router located at the venue; a personal computer or similar computing device located at the venue; a portable device carried by an employee, staff, or other person directly associated with the venue; or some similar device. Further, the venue-operated device 14 may be a general purpose device or a special-purpose device. Note that while only one venue-operated device 14 is illustrated, the system 10 may include any number of venue-operated devices 14 located at different venues. Also, a single venue may include more than one venue-operated device 14. Note that in embodiments where there are multiple venue-operated devices 14 located at the same and/or different venues, mechanisms may be employed to prevent redundant check-ins at the same venue and/or to allow a user to or prevent a user from being concurrently being checked-in at multiple venues. For instance, in order to prevent redundant check-ins at the same venue, the venue-operated devices 14 at the same venue may maintain and synch check-ins at the venue and prevent check-ins for users that are already checked-in at the venue. In a similar manner, the venue-operated devices 14 at nearby venues or venues within venues (e.g., stores within a mall) may synch check-ins to either allow or prevent multiple check-ins for the same user at the nearby venues as desired. Alternatively, the ACIS 16 may analyze check-ins reported to identify potentially redundant or erroneous check-ins, and may resolve any such multiple check-ins to a single relevant check-in based on information such as the metadata of the venue(s); the number of venue-operated devices 14 at the venue(s), the identifiers, locations and other metadata of the venue-operated device(s) 14 reporting the check-ins; the times at, and the durations for, which the venue-operated devices 14 detected and checked-in the user device 12 and other user devices; the location of the user device 12, if available; the past check-in history of the user device 12 and its user; and the like.

The venue-operated device 14 includes an ACIS moderator 32 and a local wireless network interface 34. While not shown, one of ordinary skill in the art will readily appreciate that the venue-operated device 14 includes additional components to enable its operation. The ACIS moderator 32 is preferably implemented in software and executed by a controller of the venue-operated device 14, but is not limited thereto. The ACIS moderator 32 may alternatively be implemented in a combination of hardware and software. As discussed below, the ACIS moderator 32 performs functions such as, for example, sending a request to the ACIS 16 for an automatic check-in for the user of the user device 12 at the venue when the user device 12 is within proximity to the venue-operated device 14. The local wireless network interface 34 is implemented in hardware or a combination of hardware and software and provides an interface between the venue-operated device 14 and the user device 12 via the local wireless network 26 when the user device 12 is in proximity to the venue-operated device 14.

The ACIS 16 is preferably implemented in software executed by the server computer 18. Note that while only one server computer 18 is illustrated for clarity and ease of discussion, it should be appreciated that the ACIS 16 may be hosted by multiple distributed server computers for redundancy and/or load sharing. Further, in some embodiments, the ACIS 16 may provide a web application to allow access to the ACIS 16 via a web browser. In general, the ACIS 16 performs automatic check-ins for users such as the user of the user device 12. While only the user device 12 is shown here, it should be appreciated that the ACIS 16 preferably performs automatic check-ins for many users of many user devices.

The check-in service 20 is also preferably implemented in software executed by the server computer 22. Note that while only one server computer 22 is illustrated for clarity and ease of discussion, it should be appreciated that the check-in service 20 may be hosted by multiple distributed server computers for redundancy and/or load sharing. In general, the check-in service 20 is either: (1) a web-based service whose primary function is to enable users to check-in to venues and, in some implementations, events held at venues or (2) a web-based service whose primary function is something other than enabling check-ins but that also enables users to check-in to venues and, in some implementations, events held at venues. Note that while only one check-in service 20 is illustrated for clarity and ease of discussion, the system 10 may include multiple check-in services 20.

Figure 2A:
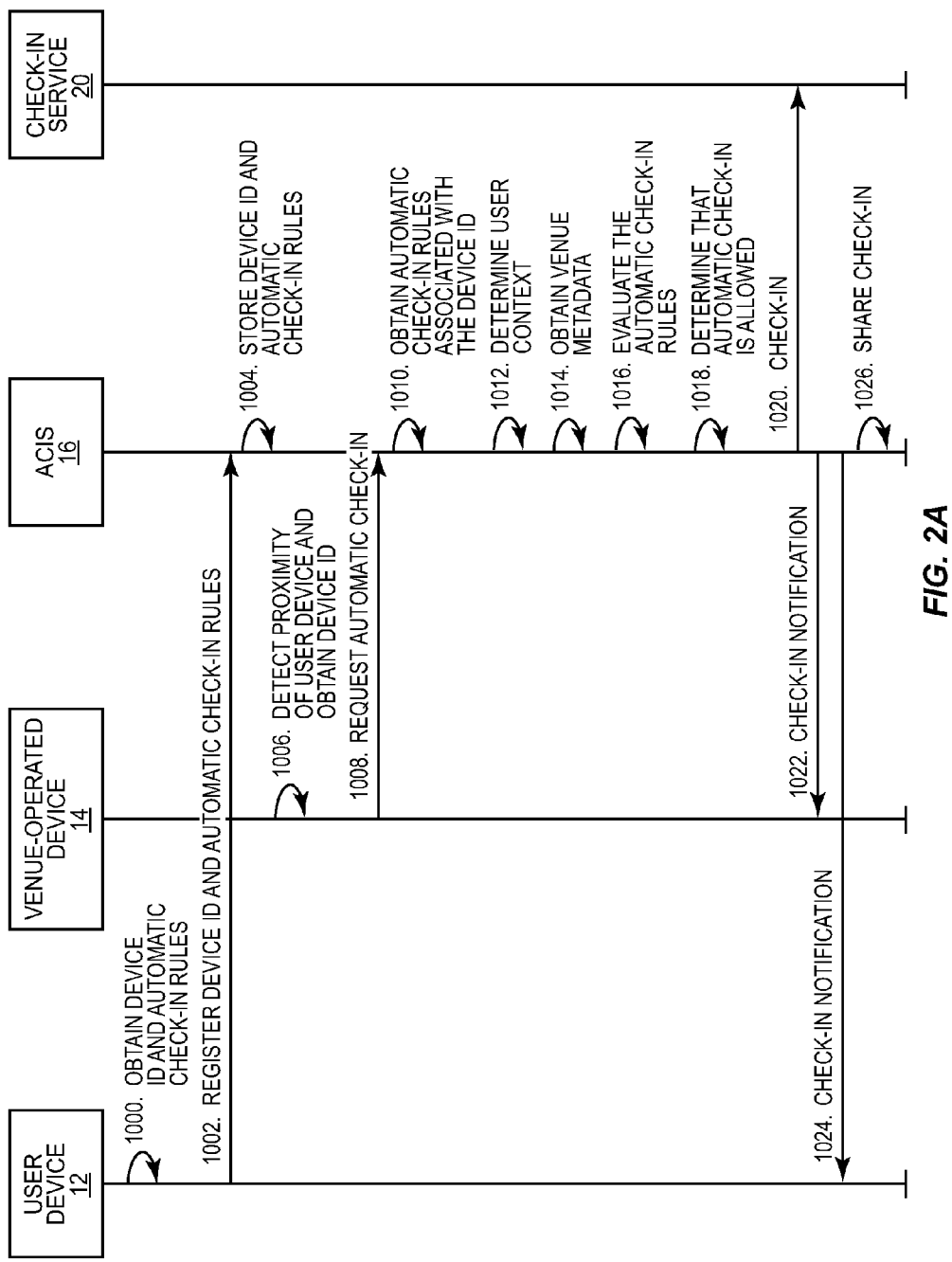
FIGS. 2A and 2B illustrate the operation of the system of FIG. 1 according to one embodiment of the present disclosure.
Figure 2B:
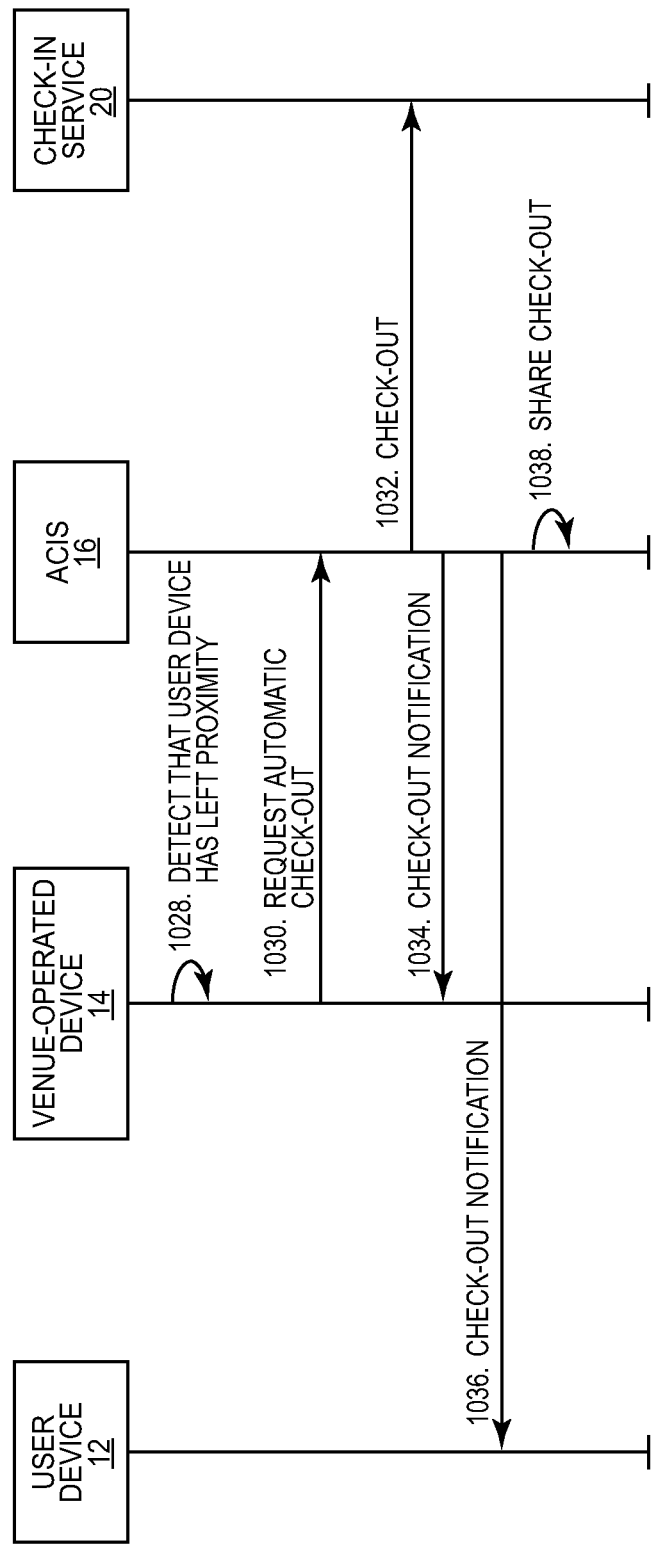

FIGS. 2A and 2B illustrate the operation of the system 10 of FIG. 1 according to one embodiment of the present disclosure. First, the user device 12, and more specifically the ACIS client 28, obtains a device identifier (ID) of the user device 12 and one or more automatic check-in rules for the user of the user device 12 (step 1000). The device ID is generally any type of identifier that uniquely identifies the user device 12. For example, the device ID may be a Media Access Control (MAC) address of the user device 12 (e.g., a WiFi® or Bluetooth® MAC address of the user device 12). As another example, the device ID may be a token (e.g., a hash value) computed from the MAC address of the user device 12 in order to, for example, maintain privacy. In addition, in some embodiments, the device ID may be encrypted. In one embodiment, the device ID may be a unique ID assigned to the user device 12 by the ACIS 16 via the ACIS client 28. Note that a new device ID may be generated and assigned for every check-in or automated check-in request.

The one or more automatic check-in rules are preferably defined or otherwise configured by the user of the user device 12. In general, the one or more automatic check-in rules define conditions under which the user allows and/or does not allow automatic check-ins. The one or more automatic check-in rules are based on criteria such as user context of the user, venue metadata, or a combination thereof. The user context of the user is generally data that describes a context of the user such as, for example, a time of day, a day of the week, a geographic location of the user, or the like. In addition or alternatively, the user context of the user may include a check-in history of the user, a location history of the user, current locations of the friends of the user (e.g., friends of the user as identified by a social graph of the user in a social network such as the Facebook® social network), location histories of the friends of the user, current check-ins for the friends of the user, and/or check-in histories for the friends of the user. The venue metadata is data that describes a venue such as, for example, a venue type (e.g., restaurant, night club, sporting area, etc.), a venue name (e.g., Starbucks®, Starbucks® store 1234, etc.), or a geographic location of the venue (e.g., latitude and longitude pair, street address, city, or the like).

Some exemplary automatic check-in rules are:
Allow automatic check-ins for the user for any Starbucks® coffee shop,
Allow automatic check-ins for the user for Starbucks® coffee shop number 1234,
Allow automatic check-in for the user for Starbucks® coffee shop located at 6813 Fayetteville Road, Durham, N.C.,
Disallow automatic check-ins for the user for any fast food restaurants except Taco Bell,
Prompt the user by Short Message Service (SMS) or push notification to allow or deny automatic check-ins to movie theaters,
On Monday through Friday during the hours of 7 A.M. to 5 P.M., only allow automatic check-ins for restaurants from 11:30 A.M. to 1 P.M.,
Do not allow automatic check-ins for bars,
Only allow automatic check-ins for venues at which the user has previously checked-in,
Only allow automatic check-ins for venues at which the user has previously checked-in at least a threshold number of times,
Only allow automatic check-ins for venues at which the user has previously been located,
Only allow automatic check-ins for venues at which the user has previously been located at least a threshold number of times,
Only allow automatic check-ins for venues at which a threshold number of friends of the user are currently checked-in,
Only allow automatic check-ins for venues at which friends of the user have previously checked-in at least a threshold number of times,
Only allow automatic check-ins for venues at which a threshold number of friends of the user are currently located, and
Only allow automatic check-ins for venues at which friends of the user have previously been located at least a threshold number of times.

It should be noted that different automatic check-in rules may be defined for different check-in services 20. The user may further be able to configure all or a subset of check-in rules to prompt the user to allow or deny a check-in on a case-by-case basis, rather than either automatically allowing or denying check-in without user input. The user may also configure the ACIS 16 to issue a notification of whether a check-in was performed or denied. The user may also configure the methods of prompting for check-in, responding to prompts for check-ins, or for issuing notifications of check-ins for each rule, such as via a text message (e.g., using SMS or e-mail), push notifications, or other methods of interacting with the user. In one embodiment, automatic check-in rules may be defined on a continuous basis. For example, each time a user of the user device 12 visits a new type of venue, the ACIS client 28 may prompt the user to configure a rule for the new type of venue, or for the specific venue itself, or both. In another embodiment, the ACIS 16 may simply prompt a user of the user device 12 to allow or deny check-ins, and may automatically define check-in rules for the user based on the user's responses by using, for instance, statistical or machine learning methods. As an example, if the user denies a check-in for a specific Starbucks® location more than a threshold number of times in a row, the ACIS 16 may configure a check-in rule automatically disallowing check-ins for that Starbucks® location. If the user further disallows check-ins for any other coffee shops for a threshold number of times in a row, the ACIS 16 may adapt the automatically defined check-in rule to disallow check-ins to all venues that are of the type "coffee shop."

Next, the user device 12, and more specifically the ACIS client 28, registers the device ID and the automatic check-in rules with the ACIS 16 (step 1002). The ACIS 16 stores the device ID and the automatic check-in rules (step 1004). The automatic check-in rules are stored in association with the device ID.

Sometime thereafter, the user device 12 comes into proximity to the venue-operated device 14. The venue-operated device 14, and more specifically the ACIS moderator 32, detects the proximity of the user device 12 and obtains the device ID of the user device 12 (step 1006). More specifically, in one exemplary embodiment, the local wireless network interface 34 broadcasts a beacon, which contains an ID of the venue-operated device 14, or discovery request, which does not include an ID of the venue-operated device 14. When the user device 12 is in proximity to the venue-operated device 14, the local wireless network interface 30 of the user device 12 receives the beacon or discovery request from the venue-operated device 14 and may respond to the beacon with the device ID of the user device 12. In another embodiment, the user device 12, and more specifically the local wireless network interface 30, broadcasts the device ID of the user device 12. When the user device 12 is in proximity of the venue-operated device 14, the local wireless network interface 34 of the venue-operated device 14 receives the device ID of the user device 12 broadcast by the user device 12, thereby detecting the proximity of the user device 12. Examples of these methods are active scanning and passive scanning methods for discovering Access Points in IEEE 802.11 wireless LANs, and the Inquiry process in Bluetooth® wireless PANs. Note that these proximity-based discovery methods are specific to commonly used wireless technologies such as WIFI® and Bluetooth®, and those skilled in the art will recognize that the scope of this disclosure extends to other short-range wireless technologies and proximity-based discovery methods.

In yet another embodiment, the venue-operated device 14 may use an application-level protocol to discover user devices, such as the user device 12, on the local wireless network 26. Bonjour is one exemplary application-layer service. Thus, it should be appreciated that proximity may be determined using discovery mechanisms that are part of various physical and MAC layer protocols or using separate discovery mechanism implemented at the application layer.

While the discussion above focuses on an embodiment where the venue-operated device 14 detects the proximity of the user device 12, the present disclosure is not limited thereto. In another embodiment, the user device 12 detects the proximity of the venue-operated device 14 and may then notify the venue-operated device 14 of their proximity to one another. For example, the user device 12 may broadcast a discovery request that does not include the device ID of the user device 12. Upon detecting the discovery request, the venue-operated device 14 may respond with an ID of the venue-operated device 14. Upon receiving the response from the venue-operated device 14, the user device 12 has detected its proximity to the venue-operated device 14 and may then notify the venue-operated device 14 of its proximity.

Notably, when providing the device ID of the user device 12 to the venue-operated device 14, privacy may be maintained by using a token as the device ID, where the token may be, for example, a hash of a MAC address or other unique identifier of the user device 12. When a token is used as the device ID, a new token may be generated and registered with the ACIS 16 every time it is presented to a venue-operated device, such as the venue-operated device 14, or after certain time-intervals, or both. When using tokens, the tokens may be computed by a background process at the user device 12 in response to, for example, receiving a beacon from the venue-operated device 14. The user device 12 may register the dynamically generated token with the ACIS 16 by communicating with the server computer 18 via the local wireless network 26 and/or the WAN 24, or by a separate network interface coupled to, for instance, a cellular wireless network (not shown). In another embodiment, in response to detecting a proximate venue-operated device 14, the user device 12 may request the ACIS 16 to generate the token, which the user device 12 provides to the venue-operated device 14. The venue-operated device 14 may additionally or alternatively use cryptographic and/or Digital Rights Management (DRM) techniques to ensure that the device ID of the user device 12 is not transmitted un-encrypted and that it cannot be associated with a user ID of the user of the user device 12 or a MAC address of the user device 12 in case a check-in is eventually allowed.

In response to detecting that the user device 12 is in proximity to the venue-operated device 14, the ACIS moderator 32 sends a request to the ACIS 16 for an automatic check-in for the user of the user device 12 at the venue of the venue-operated device 14 (step 1008). The request includes the device ID of the user device 12 and, preferably, a venue ID that identifies the venue of the venue-operated device 14.

Upon receiving the request, the ACIS 16 obtains the automatic check-in rules associated with the device ID of the user device 12 (step 1010). Note that the device ID may not always be sufficient to uniquely identify the user device 12. For example, WiFi® and Bluetooth® MAC addresses cannot be guaranteed to be globally unique because of irregularities in the manufacture of the wireless interface apparatus or because, for instance, users can often configure them to specific values. In this case, additional information may be used to disambiguate the device ID. More specifically, disambiguation may be provided by: (1) using a combination of two or more device IDs of the user device 12 (e.g., use both the Bluetooth® MAC address and the WiFi® MAC address of the user device 12) or using either the Bluetooth® or the WiFi® MAC address and an Internet Protocol (IP) address of the user device 12, (2) using the device ID of the user device 12 in conjunction with other information about the user device 12 such as a make or model of the user device 12 or a cellular network service provider for the user device 12, or (3) using the device ID of the user device 12 in conjunction with contextual information about the user and/or the user device 12 (e.g., current location, residential address of the user, work address of the user, a check-in history of the user, or the like especially when compared to the venue of the venue-operated device 14).

In this embodiment, in order to obtain information needed to evaluate the one or more automatic check-in rules, the ACIS 16 determines a user context of the user of the user device 12 (step 1012). As discussed above, the user context is generally data that defines a context of the user such as, for example, a time of day, a day of the week, a geographic location of the user, or the like. In addition or alternatively, the user context of the user may include a list of friends of the user in one or more social networks, which may be obtained from the one or more social networks using credentials provided by the user. Still further, the user context of the user may include a check-in history of the user, a location history of the user, current locations of the friends of the user (e.g., friends of the user as identified by a social graph of the user in a social network such as the Facebook® social network), current physical proximity of the user to friends of the user (e.g., based on proximity between their reported locations, or based on the user devices of friends of the user detected in wireless proximity by the user device 12), location histories of the friends of the user, current check-ins for the friends of the user, and/or check-in histories for the friends of the user. The user context may be obtained from any suitable source(s). For example, the time and date may be obtained locally, a list of friends of the user and their current locations and/or their location histories may be obtained from a social networking service, and the check-in related data may be obtained from the check-in service 20. Also note that some or all of the context data may be obtained from the user device 12 either directly or via the venue-operated device 14.

The ACIS 16 also obtains venue metadata for the venue of the venue-operated device 14 (step 1014). In one embodiment, venues, such as the venue of the venue-operated device 14, are registered with the ACIS 16. As part of the registration, venue metadata is provided to the ACIS 16. Alternatively, the ACIS 16 may request the venue metadata from the venue-operated device 14 or otherwise obtain the venue metadata. The venue metadata generally includes information that describes the venue such as, for example, a venue type of the venue (e.g., restaurant, night club, sports arena, or the like), a venue name of the venue, a geographic location of the venue (e.g., latitude and longitude pair, street address, city, or the like), one or more types of cuisine served at the venue, if any (e.g., Chinese, Indian, Continental, fast food, or the like), one or more ratings and comments attributed to the venue (e.g., from expert services such as Zagat, or from social network users such as Yelp, or the like), or the like. Next, the ACIS 16 evaluates the one or more automatic check-in rules associated with the device ID of the user device 12 based on the user context of the user of the user device 12 and the venue metadata (step 1016). Methods such as ontology and semantic analysis may be used in classifying venue metadata as well as evaluating the one or more automatic check-in rules. As an example, if a user-configured automatic check-in rule applies to "coffee shops" and a current venue metadata is "Starbucks," the venue may be classified by an ontology as a "coffee shop" and hence may trigger the evaluation of the automatic check-in rule.

Figure 3:
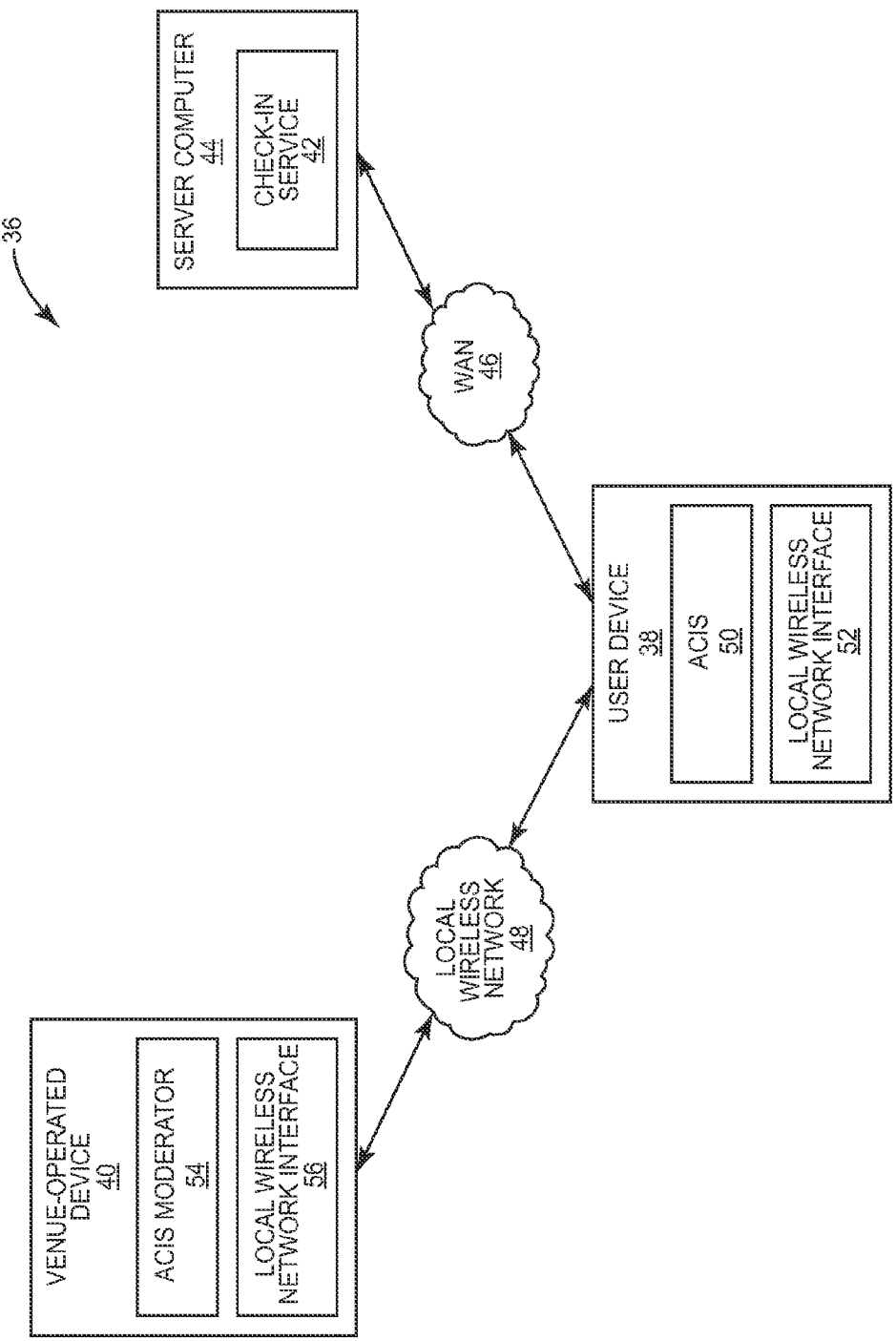
FIG. 3 illustrates a system for providing automatic check-ins according to another embodiment of the present disclosure.

In this example, based on the result of the evaluation of the one or more automatic check-in rules, the ACIS 16 determines that an automatic check-in for the user of the user device 12 at the venue of the venue-operated device 14 is allowed (step 1018). As such, the ACIS 16 performs a check-in for the user at the venue via the check-in service 20 (step 1020). Note that, in one embodiment, prior to performing the check-in, the ACIS 16 may notify the user of the user device 12 and may further ask the user for permission to perform the check-in. This notification may be provided by an internal communication mechanism provided between the ACIS 16 and the ACIS client 28, via text messaging (e.g., SMS), or the like. If this notification asks for permission from the user, the check-in may not be performed without receiving permission from the user, may not be performed if the user does not allow permission within a predefined amount of time (e.g., 5 minutes), may be performed if the user does not deny permission within a predefined amount of time (e.g., 5 minutes), depending on the particular implementation. When using text messaging, permission may be given or denied by texting a simple "yes" or "no" or some similar message, as illustrated in FIG. 3. It should also be noted that if the ACIS 16 determines that an automatic check-in is not to be performed, the ACIS 16 does not perform the automatic check-in and, optionally, notifies the user of the user device 12 and/or the venue-operated device 14.

Once the check-in has been performed, the ACIS 16 may send a check-in notification to the venue-operated device 14 and the user device 12 (steps 1022 and 1024). In response to the check-in notification, the ACIS client 28 may notify the user of the user device 12 via an audible (e.g., a predefined tone), visual, or tactile (e.g., vibrate) alert. Alternatively, the user may be notified via text messaging (e.g., SMS), where the user's cellular telephone number is registered with the ACIS 16 or obtained from a social network profile of the user. When notifying the user, different alert tones, which are referred to herein as check-in tones, may be used for different check-in services 20. As an example, different check-in tones may be configured for check-ins that are automatically allowed and check-ins that are automatically denied. Once the user device 12 is notified of the check-in, the user device 12 may configure itself to affect subsequent actions at the venue. For example, a photo taken by the user device 12 at the venue may be automatically posted to the check-in service 20. In one embodiment, the notification provided to the venue-operated device 14 includes a user ID of the user of the user device 12. Up until this point, the identity of the user of the user device 12 is not known to the venue-operated device 14. In this manner, privacy of the user is maintained until the check-in is performed. Once the identity of the user is known, a user profile of the user may be obtained and utilized by the venue-operated device 14 or some other device associated with the venue to, for example, offer coupons to the user. In another embodiment, a user may elect to keep the identity of the user private from the venue-operated device 14, in which case the ACIS 16 may not perform step 1022.

In this embodiment, the ACIS 16 may also share the check-in (step 1026). The check-in may be shared with one or more groups of users such as, for example, friends of the user of the user device 12 in one or more social networks, one or more sub-groups of the friends of the user of the user device 12 in one or more social networks, or the like. Groups of friends may be identified based on the venue metadata for the venue, user profiles of the friends (e.g., type of friend, social relations, interests, or the like), the user context of the user, a check-in history of the user, a check-in history of the user when proximate to the user's other friends, or any combination thereof. These groups of friends may be created automatically or manually and may also be static or dynamic. As an example, the ACIS 16 may cause the check-in to be posted on the user's Facebook® wall such that the check-in is shared with the user's Facebook® friends. As another example, the ACIS 16 may cause the check-in to be shared with friends of the user that are currently located at the venue, friends of the user that are currently checked-in at the venue, friends of the user that have previously been located at the venue, friends of the user that have previously checked-in at the venue, friends of the user that have user profiles that indicate that those friends may be interested in the venue, or the like. In addition to or as an alternative to sharing the check-in via one or more social networks, the ACIS 16 may share the check-in via text messages or the like, where contact information enabling the sending of the messages may be obtained from a contact list stored by the user device 12 of the user, obtained from the one or more social networks of the user of the user device 12, or the like. The sharing of the check-in may be controlled based on one or more sharing rules defined by the user of the user device 12 that are registered with the ACIS 16. For example, the user may define a rule that states that his automatic check-ins at Starbucks® are only to be shared with his friends that have an interest in coffee. The sharing of the check-in may also be controlled based on ontological and semantic analysis of venue metadata and social network user profiles by the ACIS 16 to automatically determine one or more subsets of the social network friends of a user of user device 12 with which the check-in is shared. As an example, the ACIS 16 may share a check-in into a gourmet coffee shop by the user of the user device 12 with the user's friends whose profiles indicate an interest in coffee.

Sometime after performing the automatic check-in for the user, the venue-operated device 14, and more specifically the ACIS moderator 32, detects that the user device 12 is no longer in proximity to the venue-operated device 14 (step 1028). In response, the ACIS moderator 32 sends a request to the ACIS 16 for an automatic check-out for the user of the user device 12 at the venue of the venue-operated device 14 (step 1030). Note that the check-out may alternatively be manually requested by the user of the user device 12. As another alternative, the check-out may be automatically triggered by one or more automatic check-out rules (e.g., automatically check-out after a predefined amount of time, automatically check-out at a predefined end-time for an event held at the venue, automatically check-out when a volume level detected by the user device 12 or the venue-operated device 14 falls below a predefined threshold which would be beneficial for events such as concerts, automatically check-out when a size of a peer group located at or checked-into the venue falls below a predetermined threshold, or the like).

The ACIS 16 then performs a check-out for the user from the venue of the venue-operated device 14 via the check-in service 20 (step 1032) and sends check-out notifications to the venue-operated device 14 and the user device 12 (steps 1034 and 1036). Notably, the permission to perform the automatic check-out may be obtained from the user prior to performing the check-out in the manner described above with respect to the check-in. Lastly, the ACIS 16 may share the check-out in the manner described above with respect to sharing the check-in (step 1038).

FIG. 3 illustrates a system 36 for providing automatic check-ins according to another embodiment of the present disclosure. The system 36 is similar to the system 10 of FIG. 1. However, in this embodiment, the ACIS functionality is implemented on the user device. More specifically, as illustrated, the system 36 includes a user device 38, a venue-operated device 40, and a check-in service 42 hosted by a server computer 44. The user device 38 and the server computer 44 are communicatively coupled by a WAN 46. The WAN 46 may be any type of wired or wireless WAN or any combination of WANs. For example, the WAN 46 may a distributed public network such as the Internet, where the user device 38 is connected to the WAN 46 via a wireless connection (e.g., a local wireless connection or a cellular communication network connection), and the server computer 44 is connected to the WAN 46 via wired or wireless connection. When in physical proximity to one another, the user device 38 and the venue-operated device 40 are communicatively coupled, or connected, via a local wireless network 48. The local wireless network 48 is generally a LAN or a PAN that enables a direct point-to-point wireless connection between the user device 38 and the venue-operated device 40. For example, the local wireless network 48 may be a Bluetooth® network, an IEEE 802.11x network, or a similar local wireless network.

The user device 38 is a mobile user device such as, for example, a smartphone, cellular telephone, portable gaming device, portable media player, or similar portable user device. In this embodiment, the user device 38 includes an ACIS 50 and a local wireless network interface 52. While not shown, one of ordinary skill in the art will readily appreciate that the user device 38 includes additional components to enable its operation. The ACIS 50 is preferably implemented in software and executed by a controller of the user device 38, but is not limited thereto. The ACIS 50 may alternatively be implemented in a combination of hardware and software. As discussed below, the ACIS 50 performs an automatic check-in process for the user of the user device 38 at the venue of the venue-operated device 40 in response to the user device 38 being in proximity to the venue-operated device 40. The local wireless network interface 52 is implemented in hardware or a combination of hardware and software and provides an interface between the user device 38 and the venue-operated device 40 via the local wireless network 48 when the user device 38 is in proximity to the venue-operated device 40.

The venue-operated device 40 is generally a physical device located at a particular venue. More specifically, the venue-operated device 40 may be a wireless network access point or router located at the venue; a personal computer or similar computing device located at the venue; a portable device carried by an employee, staff, or other person directly associated with the venue; or some similar device. Further, the venue-operated device 40 may be a general purpose device or a special-purpose device. Note that while only one venue-operated device 40 is illustrated, the system 36 may include any number of venue-operated devices 40 located at different venues. Also, a single venue may include more than one venue-operated device 40.

The venue-operated device 40 includes an ACIS moderator 54 and a local wireless network interface 56. While not shown, one of ordinary skill in the art will readily appreciate that the venue-operated device 40 includes additional components to enable its operation. The ACIS moderator 54 is preferably implemented in software and executed by a controller of the venue-operated device 40, but is not limited thereto. The ACIS moderator 54 may alternatively be implemented in a combination of hardware and software. As discussed below, the ACIS moderator 54 performs functions such as, for example, triggering an automatic check-in process in response to detecting that the user device 38 is in proximity to the venue-operated device 40. The ACIS moderator 54 may trigger the automatic check-in process by sending a request to the user device 38 in response to detecting that the user device 38 is in proximity to the venue-operated device 40 or by broadcasting a beacon and, optionally, venue metadata for the venue. The local wireless network interface 56 is implemented in hardware or a combination of hardware and software and provides an interface between the venue-operated device 40 and the user device 38 via the local wireless network 48 when the user device 38 is in proximity to the venue-operated device 40.

The check-in service 42 is preferably implemented in software executed by the server computer 44. Note that while only one server computer 44 is illustrated for clarity and ease of discussion, it should be appreciated that the check-in service 42 may be hosted by multiple distributed server computers for redundancy and/or load sharing. In general, the check-in service 42 is either: (1) a web-based service whose primary function is to enable users to check-in to venues and, in some implementations, events held at venues or (2) a web-based service whose primary function is something other than enabling check-ins but that also enables users to check-in to venues and, in some implementations, events held at venues. Note that while only one check-in service 42 is illustrated for clarity and ease of discussion, the system 36 may include multiple check-in services 42.

Figure 4:
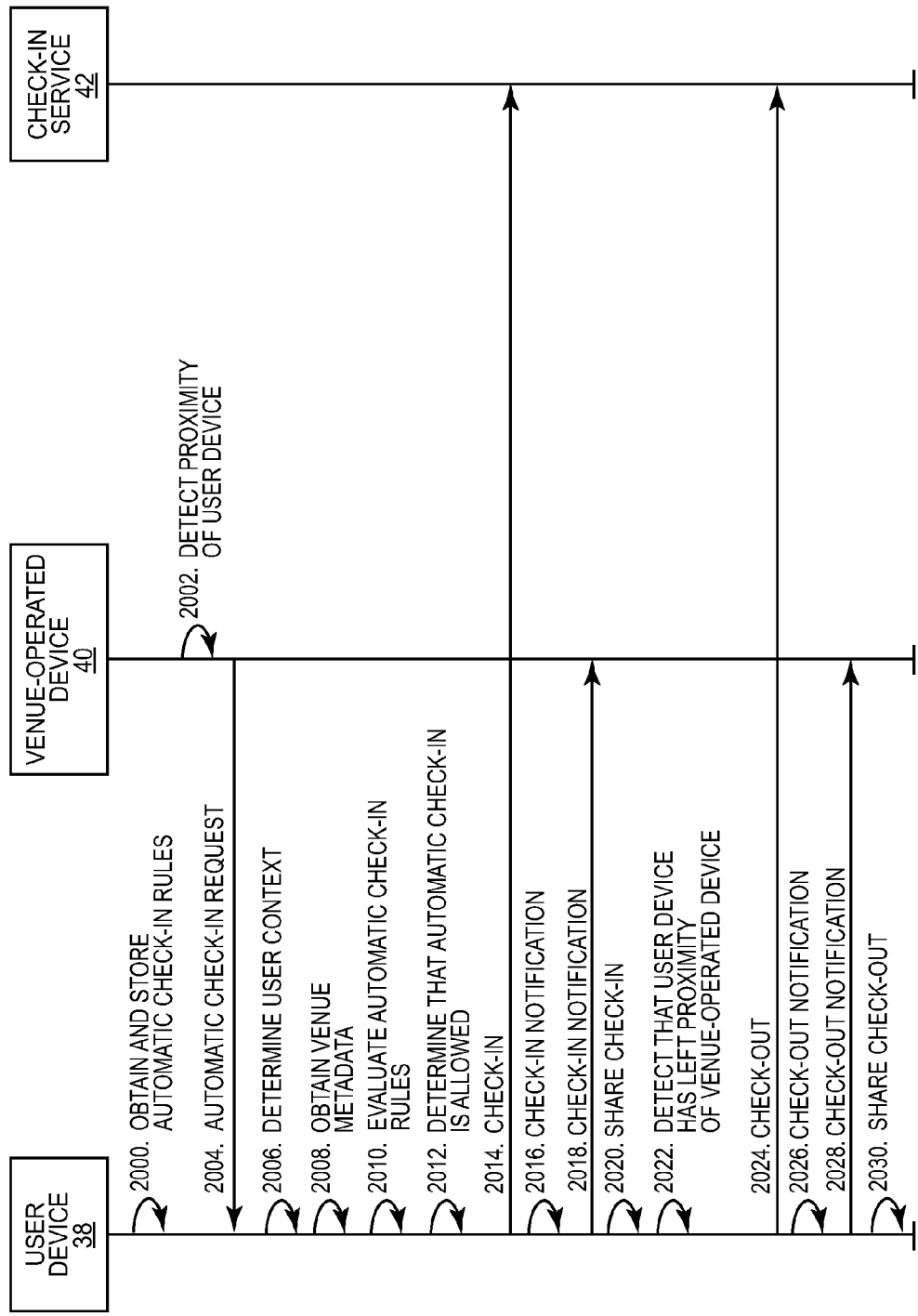
FIG. 4 illustrates the operation of the system of FIG. 3 according to one embodiment of the present disclosure.

FIG. 4 illustrates the operation of the system 36 of FIG. 3 according to one embodiment of the present disclosure. First, the user device 38, and more specifically the ACIS 50, obtains and stores one or more automatic check-in rules for the user of the user device 38 (step 2000). The one or more automatic check-in rules are preferably defined or otherwise configured by the user of the user device 38. As discussed above, in general, the one or more automatic check-in rules define conditions under which the user allows and/or does not allow automatic check-ins. The one or more automatic check-in rules are based on criteria such as, for example, a user context of the user, venue metadata, or a combination thereof.

Sometime thereafter, the user device 38 comes into proximity to the venue-operated device 40. In this embodiment, the venue-operated device 40, and more specifically the ACIS moderator 54, detects the proximity of the user device 38 (step 2002). More specifically, in one exemplary embodiment, the local wireless network interface 56 of the venue-operated device 40 broadcasts a beacon, which contains an ID of the venue-operated device 14, or discovery request, which does not include an ID of the venue-operated device 14. When the user device 38 is in proximity to the venue-operated device 40, the local wireless network interface 52 of the user device 38 receives the beacon or discovery request from the venue-operated device 40 and may respond to the beacon with a device ID of the user device 38. In another embodiment, the user device 38, and more specifically the local wireless network interface 52, broadcasts the device ID of the user device 38. When the user device 38 is in proximity of the venue-operated device 40, the local wireless network interface 56 of the venue-operated device 40 receives the device ID of the user device 38 broadcast by the user device 38, thereby detecting the proximity of the user device 38. Examples of these methods are active scanning and passive scanning methods for discovering Access Points in IEEE 802.11 wireless LANs, and the Inquiry process in Bluetooth® wireless PANs. Note that these proximity-based discovery methods are specific to commonly used wireless technologies such as WIFI® and Bluetooth®, and those skilled in the art will recognize that the scope of this disclosure extends to other short-range wireless technologies and proximity-based discovery methods.

In yet another embodiment, the venue-operated device 40 may use an application-level protocol to discover user devices, such as the user device 38, on the local wireless network. Bonjour is one exemplary application-layer service. Thus, it should be appreciated that proximity may be determined using discovery mechanisms that are part of various physical and MAC layer protocols or using separate discovery mechanism implemented at the application layer.

While the discussion above focuses on an embodiment where the venue-operated device 40 detects the proximity of the user device 38, the present disclosure is not limited thereto. In another embodiment, the user device 38 detects the proximity of the venue-operated device 40. For example, the user device 38 may broadcast a discovery request that does not include the device ID of the user device 38. Upon detecting the discovery request, the venue-operated device 40 may respond with an ID of the venue-operated device 40. Upon receiving the response from the venue-operated device 40, the user device 38 has detected its proximity to the venue-operated device 40.

In response to detecting that the user device 38 is in proximity to the venue-operated device 40, the ACIS moderator 54 sends a request to the ACIS 50 for an automatic check-in for the user of the user device 38 at the venue of the venue-operated device 40 (step 2004). In response to receiving the request, the ACIS 50 performs an automatic check-in process, as described below. However, before describing the automatic check-in process, it should be noted that steps 2002 and 2004 are only one way in which the automatic check-in process may be triggered in response to proximity of the user device 38 to the venue-operated device 40. In one alternative embodiment, the venue-operated device 40 broadcasts an identifier of the venue and, in some embodiments, venue metadata that describes the venue. Then, when the user device 38 is in proximity to the venue-operated device 40, the user device 38 receives the broadcast from the venue-operated device 40. In response, the ACIS 50 performs the automatic check-in process.

Once the automatic check-in process has been triggered, in this embodiment, the ACIS 50 determines a user context of the user of the user device 38 (step 2006) and obtains venue metadata that describes the venue of the venue-operated device 40 (step 2008). Next, the ACIS 50 evaluates the one or more automatic check-in rules of the user of the user device 38 based on the user context of the user of the user device 38 and the venue metadata (step 2010). In this example, based on the result of the evaluation of the one or more automatic check-in rules, the ACIS 50 determines that an automatic check-in for the user of the user device 38 at the venue of the venue-operated device 40 is allowed (step 2012). As such, the ACIS 50 performs a check-in for the user at the venue via the check-in service 42 (step 2014). Note that, in one embodiment, prior to performing the check-in, the ACIS 50 may notify the user of the user device 38 and may further ask the user for permission to perform the check-in. If this notification asks for permission from the user, the check-in may not be performed without receiving permission from the user or may be performed if the user does not deny permission within a predefined amount of time (e.g., 5 minutes). It should also be noted that if the ACIS 50 determines that an automatic check-in is not to be performed, the ACIS 50 does not perform the automatic check-in and, optionally, notifies the user of the user device 38 and/or the venue-operated device 40. In one embodiment, before allowing the check-in, the check-in service 42 obtains a device ID of the user device 38 and sends a request to the venue-operated device 40 to check if the venue-operated device 40 detects the user device 38 in its proximity. If the venue-operated device 40 does not detect the user device 38 in its proximity, the check-in may not be processed.

In one embodiment, the venue-operated device 40 provides an encrypted identifier or a one-time token generated as an identifier for the venue to the user device 38, and registers it with the check-in service 42 such that the user device 38 may not be able to re-use the identifier or perform automatic check-ins for the venue without being in proximity to the venue-operated device 40. The user device 38 provides the one-time venue identifier to the check-in service 42 to retrieve the unencrypted venue identifier and the venue metadata and to perform a one-time check-in. In another embodiment, the venue-operated device 40 requests the check-in service 42 to generate and provide the one-time identifier via the local wireless network 48, which may be coupled to the WAN 46, and the venue-operated device 40 provides this one-time identifier to the user device 38 for automated check-in purposes. In some embodiments, if the user device 38 is enabled with a location sensor such as a Global Positioning System (GPS) component, the user device 38 may provide its current location coordinates to the check-in service 42 along with the automatic check-in request, which may compare the user device 38 coordinates with the coordinates reported by the venue-operated device 40, and may process the automatic check-in request only if the coordinates substantially match. These embodiments may prevent fraudulent and/or erroneous check-ins to venues at which the user is not currently located.

Once the check-in has been performed, the ACIS 50 provides a check-in notification to the user of the user device 38 (step 2016) and also provides a check-in notification to the venue-operated device 40 (step 2018). When notifying the user, different alert tones, which are referred to herein as check-in tones, may be used for different check-in services 42. Once the check-in is performed, the user device 38 may configure itself to affect subsequent actions at the venue. For example, a photo taken by the user device 38 at the venue may be automatically posted to the check-in service 42. In one embodiment, the notification provided to the venue-operated device 40 includes a user ID of the user of the user device 38. Up until this point, the identity of the user of the user device 38 is not known to the venue-operated device 40. In this manner, privacy of the user is maintained until the check-in is performed.

In this embodiment, the ACIS 50 may also share the check-in in the manner described above (step 2020). Sometime after performing the check-in, the user device 38, and more specifically the ACIS 50, detects that the user device 38 is no longer in proximity to the venue-operated device 40 (step 2022). This may be detected when, for example, a periodic or otherwise repeated broadcast from the venue-operated device 40 is no longer detected. In response, the ACIS 50 performs a check-out for the user from the venue of the venue-operated device 40 via the check-in service 42 (step 2024) and provides a check-out notification to the user of the user device 38 (step 2026). In addition, the ACIS 50 may provide a check-out notification to the venue-operated device 40 via, for example, the WAN 46 or some other network connection (step 2028). Note that, in an alternative embodiment, the venue-operated device 40 may perform step 2022 and send the check-out request directly to the check-in service 42. Notably, permission to perform the automatic check-out may be obtained from the user prior to performing the check-out in the manner described above with respect to the check-in. Also, it should be noted that the automatic check-out process may alternatively be triggered by a manual request from the user of the user device 38 or one or more automatic check-out rules. Lastly, the ACIS 50 may share the check-out in the manner described above (step 2030).

Figure 5:
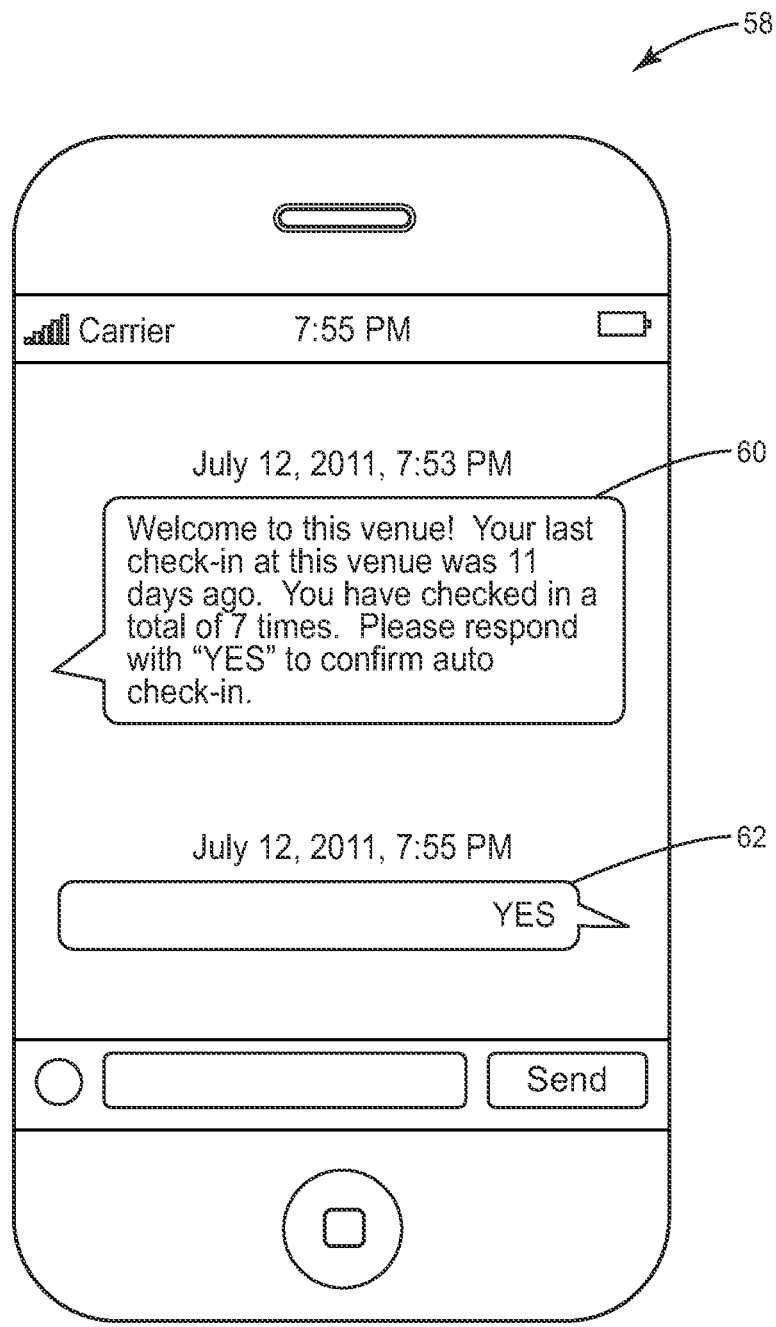
FIG. 5 is an exemplary Graphical User Interface (GUI) of a user device that illustrates a text messaging scheme for obtaining permission from a user of the user device before performing an automatic check-in on behalf of the user according to one embodiment of the present disclosure.

FIG. 5 is an exemplary Graphical User Interface (GUI) 58 illustrating a text messaging scheme used to obtain approval from a user prior to performing an automatic check-in on behalf of the user. The GUI 58 is presented at either of the user devices 12, 38. As shown, a text message 60 is first sent to the user asking for permission to perform an automatic check-in at a venue. In this example, the user desired to allow the automatic check-in, so the user returns a text message 62 saying "Yes." Note that text messaging may be used so that the user device 12, 38 does not need any special application other than conventional text messaging to permit automatic check-ins as described herein. In fact, text messaging would allow users of mobile telephones other than smartphones (i.e., so called "dumb" mobile telephones) to give or deny permission for automatic check-ins. In one embodiment, the text message 60 may include the name and other metadata of the venue so that the user knows which venue he or she is being checked into. In the embodiment of FIG. 1, the text message sent to the user asking for permission for the automatic check-in may be sent by the venue-operated device 14 via an external text messaging service prior to sending the request to the ACIS 16 for the automatic check-in or may be sent by the ACIS 16 prior to determining that an automatic check-in is allowed for the user. Similarly, in the embodiment of FIG. 3, the text message may be sent by the venue-operated device 40 or, alternatively, the user device 38 via an external text messaging service.

Notably, the text message 60, or in fact any other type of check-in notification, may include a coupon or promotional offer (e.g., in the form of redemption codes) or information on "specials" at the venue. Potentially a coupon or offer could be provided only if the user allows the auto check-in. In another embodiment, the venue-operated device 14 may automatically apply (or may request the venue owner to apply) the coupon or promotional offer following an allowed check-in by the user device 38.

Figure 6:
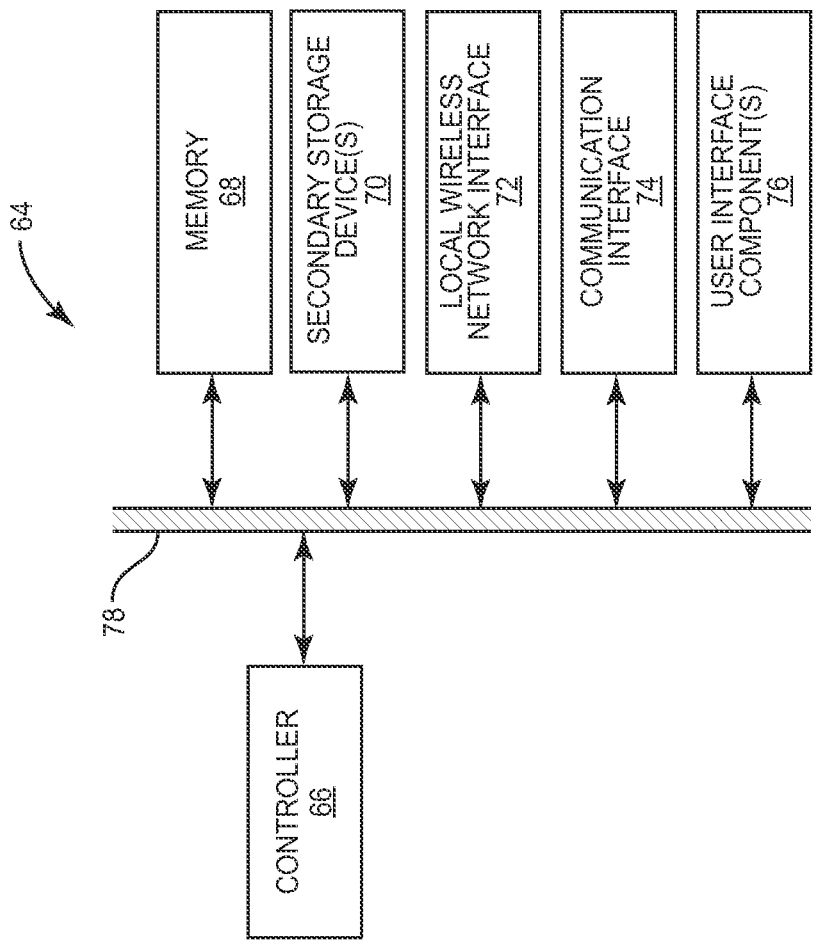
FIG. 6 is a block diagram of a user device according to one embodiment of the present disclosure.

FIG. 6 is a block diagram of a user device 64 according to one embodiment of the present disclosure. The user device 64 may be, for example, the user device 12 of FIG. 1 or the user device 38 of FIG. 3. As illustrated, the user device 64 includes a controller 66 connected to memory 68, one or more secondary storage devices 70, a local wireless network interface 72, a communication interface 74, and one or more user interface components 76 by a bus 78 or similar mechanism. Note, however, that while not shown, the user device 64 may include additional components. The controller 66 is a microprocessor, digital Application Specific Integrated Circuit (ASIC), Field Programmable Gate Array (FPGA), or similar hardware device. In this embodiment, the controller 66 is a microprocessor, and software is stored in the memory 68 for execution by the controller 66 to provide the functions described herein. The one or more secondary storage devices 70 are digital storage devices such as, for example, one or more hard disk drives. The local wireless network interface 72 is implemented in hardware or a combination of hardware and software. For example, the local wireless network interface 72 may be a Bluetooth® network interface, an IEEE 802.11x network interface, or both. In some embodiments, the user device 64 also includes the communication interface 74 for communicating via the WAN 24 or 46 (FIGS. 1 and 3). Note, however, that the same network interface may provide connectivity to the local wireless network 26 or 48 and the WAN 24 or 46. The communication interface 74 may be, for example, a cellular communication network interface. The one or more user interface components 76 include, for example, a touchscreen, a display, one or more user input components (e.g., a keypad), a speaker, or the like, or any combination thereof.

Figure 7:
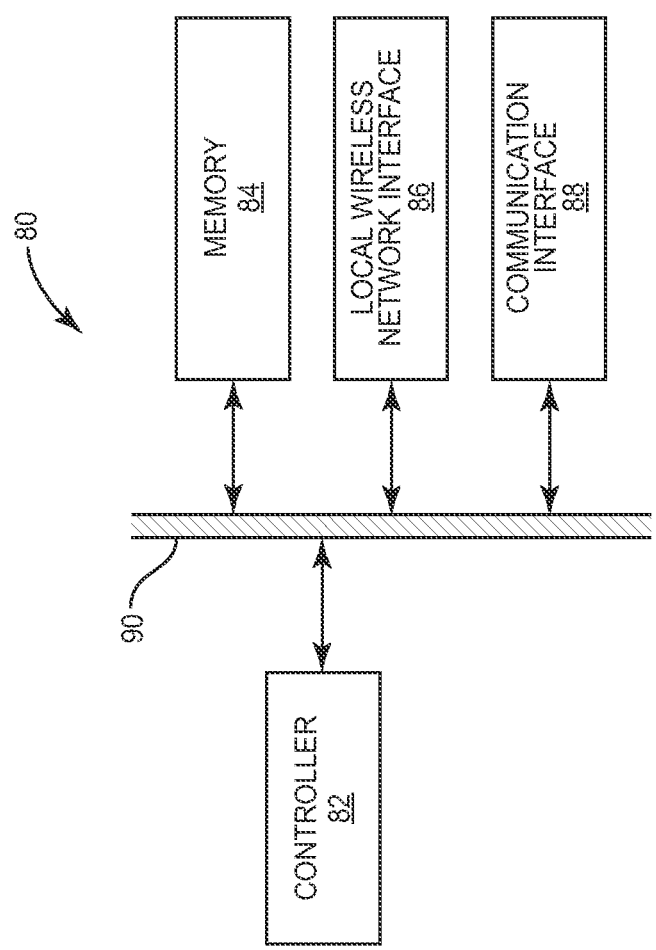
FIG. 7 is a block diagram of a venue-operated device according to one embodiment of the present disclosure.

FIG. 7 is a block diagram of a venue-operated device 80 according to one embodiment of the present disclosure. The venue-operated device 80 may be, for example, the venue-operated device 14 of FIG. 1 or the venue-operated device 40 of FIG. 3. As illustrated, the venue-operated device 80 includes a controller 82 connected to memory 84, a local wireless network interface 86, and a communication interface 88 by a bus 90 or similar mechanism. Note, however, that while not shown, the venue-operated device 80 may include additional components (e.g., one or more secondary storage devices). The controller 82 is a microprocessor, digital ASIC, FPGA, or similar hardware device. In this embodiment, the controller 82 is a microprocessor, and software is stored in the memory 84 for execution by the controller 82 to provide the functions described herein. The local wireless network interface 86 is implemented in hardware or a combination of hardware and software. For example, the local wireless network interface 86 may be a Bluetooth® network interface or an IEEE 802.11x network interface. The communication interface 88 is implemented in hardware or a combination of hardware and software and enables communication via the WAN 24 or 46. The communication interface 88 may be, for example, a cellular communication network interface. Note, however, that the same network interface may provide connectivity to the local wireless network 26 or 48 and the WAN 24 or 46 (i.e., a single network interface may operate as the local wireless network interface 86 and the communication interface 88).

Figure 8:
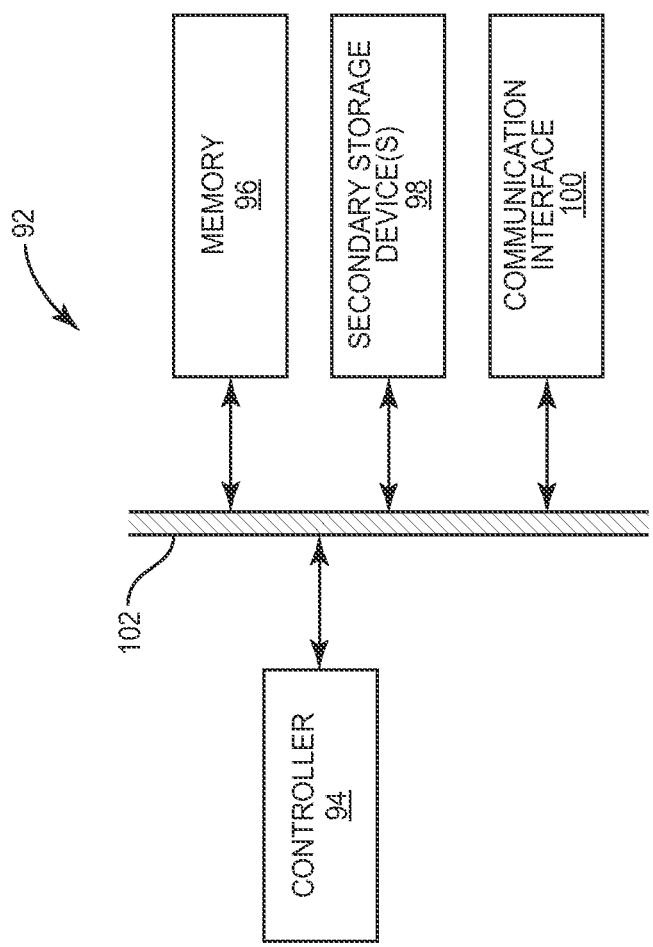
FIG. 8 is a block diagram of a server computer according to one embodiment of the present disclosure.

FIG. 8 is a block diagram of a server computer 92 according to one embodiment of the present disclosure. The server computer 92 may be, for example, the server computer 18 or 22 of FIG. 1 or the server computer 44 of FIG. 3. As illustrated, the server computer 92 includes a controller 94 connected to memory 96, one or more secondary storage devices 98, and a communication interface 100 by a bus 102 or similar mechanism. Note, however, that while not shown, the server computer 92 may include additional components. The controller 94 is a microprocessor, digital ASIC, FPGA, or similar hardware device. In this embodiment, the controller 94 is a microprocessor, and software is stored in the memory 96 for execution by the controller 94 to provide the functions described herein. The one or more secondary storage devices 98 may be, for example, one or more hard drives or the like. The communication interface 100 is implemented in hardware or a combination of hardware and software. The communication interface 102 provides a wired or wireless network interface to the WAN 24 or 46.

The following exemplary use case illustrates at least some of the concepts discussed herein. However, this use case is provided an example only and is not to be construed as limiting the scope of the present disclosure.

1. John walks into a Starbucks® coffee shop and orders a coffee.
2. The Starbucks® WiFi® access point detects John's user device 12 (e.g., John's iPhone®), and obtains the device ID of the user device 12 (e.g., the WiFi® MAC address of John's iPhone®).
3. The WiFi® access point reports the device ID to the ACIS 16.
4. The ACIS 16 identifies the user as John based on the user profile registered with the reported device ID, and retrieves John's account and associated automatic check-in rules.
5. The ACIS 16 compares John's automatic check-in rules with his current context and venue metadata that describes his venue, which in this example is the Starbucks® coffee shop.
6. John has defined an automatic check-in rule to "always allow" and "check-in to Foursquare® and Gowalla®" for any venue whose metadata includes the keyword "coffee."
7. As such, the ACIS 16 automatically checks John in to Foursquare® and Gowalla®.
8. Later, at noon, John goes to lunch with his buddies to Mongolian Grill.
9. A venue-operated device 14 at the Mongolian Grill detects John's user device 12, this time via Bluetooth® proximity.
10. The venue-operated device 14 reports John's Bluetooth® ID to the ACIS 16, which again identifies John and his automatic check-in rules based on the user profile registered with the reported Bluetooth® ID.
11. John has configured an automatic check-in rule to "always allow" and "check-in to Foursquare® and Foodspotting®" for venues related to food between the hours of 11 A.M. and 1 P.M.
12. Since the ACIS 16 determines that the venue is a restaurant, and the time is between the allowed hours, the ACIS 16 checks John into the Mongolian Grill via Foursquare® and Foodspotting®.
13. In the evening, John goes to a pub for happy hour.
14. John has defined an automatic check-in rule to deny all check-ins to venues described as "bars" or "pubs" during weekdays to avoid angering his wife.
15. Hence, even though the venue-operated device 14 (e.g., WiFi® access point) at the pub detects John's user device 12, the ACIS 16 does not perform a check-in for John at the pub.

While the discussion herein is focused on automatic check-ins, the concepts described herein may additionally or alternatively be used to provide other features such as, for example, a trusted check-in feature. More specifically, the venue-operated devices 14 and 40 may be used to verify that users are located at the venues that they check-in to. This verification may be performed before allowing a user to perform a check-in at a venue having a venue-operated device 14 or 40 or may be performed to discard check-ins after the check-ins have been performed. Verification may be performed by verifying that the user device 12 or 38 of a user is located in proximity to the venue-operated device 14 or 40 before allowing the user to check-in to the corresponding venue or an event held at the corresponding venue. A similar verification process may be used to verify a check-in after it has been made by a user.

Those skilled in the art will recognize improvements and modifications to the preferred embodiments of the present disclosure. All such improvements and modifications are considered within the scope of the concepts disclosed herein and the claims that follow.

What is claimed is:

1. A method of operation of a computing device comprising:
performing an automatic social check-in process on behalf of a user of a user device in response to proximity between a user device and a venue-operated device located at a venue.

2. The method of claim 1 wherein the user device is in proximity to the venue-operated device when the user device is within a local wireless network coverage area of the venue-operated device.

3. The method of claim 1 wherein the user device is in proximity to the venue-operated device when the user device is within a local wireless network coverage area of the venue-operated device and at least one additional criteria for proximity is satisfied.

4. The method of claim 1 wherein the user device is in proximity to the venue-operated device when the venue-operated device is within a local wireless network coverage area of the user device.

5. The method of claim 1 wherein the user device is in proximity to the venue-operated device when the venue-operated device is within a local wireless network coverage area of the user device and at least one additional criteria for proximity is satisfied.

6. The method of claim 1 further comprising:
obtaining one or more automatic social check-in rules for the user of the user device;
wherein performing the automatic social check-in process comprises: evaluating the one or more automatic social check-in rules to determine whether an automatic social check-in is allowed for the user at the venue; and automatically performing a social check-in for the user at the venue via a social check-in service if the automatic social check-in is allowed for the user at the venue.

7. The method of claim 6 wherein the one or more automatic social check-in rules define at least one of a group consisting of:
one or more conditions under which automatic social check-ins are allowed for the user and one or more conditions under which automatic social check-ins are not allowed for the user.

8. The method of claim 7 wherein the one or more automatic social check-in rules are based on at least one of a group consisting of a user context of the user and venue metadata that describes the venue.

9. The method of claim 8 wherein the one or more automatic social check-in rules are based on the user context of the user, and the user context of the user comprises at least one of a group consisting of: a time of day, a day of the week, and a current location of the user.

10. The method of claim 8 wherein the one or more automatic social check-in rules are based on the user context of the user, and the user context of the user comprises at least one of a group consisting of: a list of friends of the user, current physical proximity of the user to one or more friends of the user, current locations of the friends of the user, previous locations of the friends of the user, current social check-ins for the friends of the user, and/or previous social check-ins for the friends of the user.

11. The method of claim 8 wherein the one or more automatic social check-in rules are based on the venue metadata, and the venue metadata comprises at least one of a group consisting of: a venue type of the venue, a venue name of the venue, and a location of the venue.

12. The method of claim 6 further comprising notifying the venue-operated device of the social check-in of the user at the venue.

13. The method of claim 12 wherein notifying the venue-operated device of the social check-in of the user at the venue comprises providing information that identifies the user to the venue-operated device.

14. The method of claim 6 further comprising notifying the user device of the social check-in of the user at the venue.

15. The method of claim 6 further comprising sharing the social check-in of the user at the venue with at least one friend of the user.

16. The method of claim 6 further comprising sharing the social check-in of the user at the venue with a defined group of users.

17. The method of claim 16 wherein the defined group of users is a statically defined group of users.

18. The method of claim 16 wherein the defined group of users is a dynamically defined group of users.

19. The method of claim 16 wherein the defined group of users is a group of friends of the user defined based on at least one of a group consisting of:
venue metadata that describes the venue, user profiles of the friends of the user, a user context of the user, a social check-in history of the user, and a social check-in history of the user when proximate to the friends of the user.

20. The method of claim 1 wherein the computing device is a server computer, and the method further comprises:
receiving an automatic social check-in request from the venue-operated device in response to the user device being in proximity to the venue-operated device; wherein performing the automatic social check-in process comprises performing the automatic social check-in process in response to receiving the automatic social check-in request.

21. The method of claim 1 wherein the computing device is the user device.

22. A computing device comprising: at least one network interface; and a controller associated with the at least one network interface and adapted to:
perform an automatic social check-in process on behalf of a user of a user device in response to proximity between a user device and a venue-operated device located at a venue.

23. A non-transitory computer-readable medium storing software for instructing a controller of a computing device to: perform an automatic social check-in process on behalf of a user of a user device in response to proximity between a user device and a venue-operated device located at a venue.

* * * * *